US006535866B1

(12) United States Patent
Iwadate

(10) Patent No.: US 6,535,866 B1
(45) Date of Patent: Mar. 18, 2003

(54) METHOD AND APPARATUS FOR INFORMING ANALYSIS RESULT OF DATABASE

(75) Inventor: Akihito Iwadate, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/468,068

(22) Filed: Dec. 20, 1999

(30) Foreign Application Priority Data

Dec. 22, 1998 (JP) .......................................... 10-364166

(51) Int. Cl.[7] .............................................. G06F 15/18
(52) U.S. Cl. ............................. 706/61; 707/3; 709/224
(58) Field of Search ............................ 706/61, 45, 46; 709/224; 707/3

(56) References Cited

U.S. PATENT DOCUMENTS 6,363,422 B1 * 3/2002 Hunter et al. ............... 709/218

* cited by examiner

Primary Examiner—John A. Follansbee
Assistant Examiner—Joseph P. Hirl
(74) Attorney, Agent, or Firm—Frishauf, Holtz, Goodman & Chick, P.C.

(57) ABSTRACT

A method and device for automatically informing an end user of a message resulting from regular analysis of data on a database. A storage 3 stores result transmission requirements 4 which is prepared for determining whether the message resulting from regular analysis of the data by a database system 1 should be transmitted to an end user 2 or not. A result fetch section 5 fetches analysis results from the database system 1. A mail host 6 transmits an e-mail addressed to the end user 2 when a fetched analysis result satisfies the result transmission requirements 4 in order to inform the end user 2 of the requirement satisfaction. The transmitted e-mail is stored in a mail server 7 via a network 8. The end user 2 obtains the e-mails addressed to him/her from the mail server 7 by operating a mail client 9. The end user 2 notices that the analysis result which satisfies the result transmission requirements 4 has been issued by the database system 1. The notice is helpful for solving problems regarding to business affairs to which the end user 2 relates.

7 Claims, 8 Drawing Sheets

| DATE (Y/M) | K |
|---|---|
| ITEM NAME | K |
| PRODUCT NAME | K |
| ARRIVAL QUANTITY | |
| SHIPMENT QUANTITY | |
| STOCK QUANTITY | |

FIG.3

| TITLE | CHECK WATCH INVENTRY |
|---|---|
| TARGET FILE | INVENTRY FILE |
| EXTRACTION REQUIREMENTS | Y/M = 199809 |
| | ITEM = WATCH |
| | |
| ANALYSIS TARGETS | PRODUCT NAME |
| | STOCK QUANTITY |

FIG.4

| SERVER ADD. | mailhost. co. jp |
|---|---|
| MAIL ADD. | aloit@mailhost. co. jp |
| PASSWAORD | xxxx |

FIG.5A

| TARGET | STOCK QUANTITY |
|---|---|
| IF | >10000 |
| PRIMARY ADD. | abc@mailhost. co. jp |
| SUBJECT | INVENTRY WARNING (WATCH) |
| SECONDARY ADD. | def@mailhost. co. jp |
| IF | SENT 3 TIMES IN LAST 7 DAYS |

FIG.5B

| FROM | 1998/9/24 |
|---|---|
| SCHEDULE | EVERYDAY AT 8:00 A.M. |

FIG.5C

From:alert@mailhost. co. jp

Date:Thu, 24 Sep 1998 8:7:51 + 0900 (JTS)

To:abc@mailhost. co. jp

Subject:INVENTRY WARNING (WATCH)

| PRODUCT | STOCK QUANTITY |
|---------|----------------|
| W101 | 100100 |
| W901 | 100050 |

FIG.9

METHOD AND APPARATUS FOR INFORMING ANALYSIS RESULT OF DATABASE

BACKGROUND OF THE INVENTION

1. Field of the Invention

The present invention relates to a technique for informing an end user of results after analyzing data on a database via a network.

2. Description of the Related Art

In a database system in a so-called back bone system, various data items resulting from daily business affairs are updated and stocked. Those stocked data items are constantly gathered and processed for daily or monthly analysis. Analysis results are usually utilized for business affair improvement. For example, utilization of the analysis results is helpful for better inventory management in warehouses. That is, decision for stock control may be made in accordance with the analysis result. The stock control includes, for example, decrease future arrivals when excess stock is found, or increase arrivals for a fine season of business.

Recent business systems in a back bone system usually have a data processing tool called OLAP (OnLine Analytical Processing) which allows an end user to search a database and gather data items in order to find problems and solutions. However, clients which can receive analysis results given by OLAP are limited. That is, a client is required to have application software such as DSS (Decision Support System) or EIS (Execute Information System) which is oriented to database analysis, for receiving the results. Such systems prevent the end user from receiving constantly issued results when he/she cannot use the client. As a result, the end user may miss emergency information representing a problem which should be solved immediately. Therefore, it is difficult to realize an improvement in business affairs.

SUMMARY OF THE INVENTION

It is an object of the present invention to provide a method and an apparatus for informing database analysis results, in which an electronic message indicating that a result of regular analysis of data on a database satisfies predetermined result transmission requirements is automatically prepared and transmitted to a network in order to inform an end user of the requirement satisfaction has been found.

It is another object of the present invention to provide a method and an apparatus for informing database analysis results, in which an electronic mail, which is the same as an electronic mail addressed to an end user, is automatically prepared and transmitted to a substitute for the end user after the electronic mail has been transmitted to the end user for predetermined times.

According to the present invention, it is provided a method of informing a data analysis result, employed in a database system which informs an end user of a message resulting from regular analysis of data on a database, the method comprises the steps of:

specifying requirements for informing the analysis result;

fetching data resulting from the regular analysis of data on the database; and transmitting an electronic message, when the fetched analysis result satisfies the specified requirements, to the end user to inform the end user that the specified requirements are satisfied.

BRIEF DESCRIPTION OF THE DRAWINGS

These objects and other objects and advantages of the present invention will become more apparent upon reading of the following detailed description and the accompanying drawings in which:

FIG. 3 his a diagram showing the structure of a stock management file;

FIG. 4 is a diagram exemplifying output specification data;

FIGS. 5A to 5C are diagrams each exemplifying specification of warning management data;

FIG. 9 is a diagram exemplifying a warning mail message.

DETAILED DESCRIPTION OF THE PREFERRED EMBODIMENT

An embodiment of the present invention will now be described with reference to the accompanying drawings.

Figure 1:
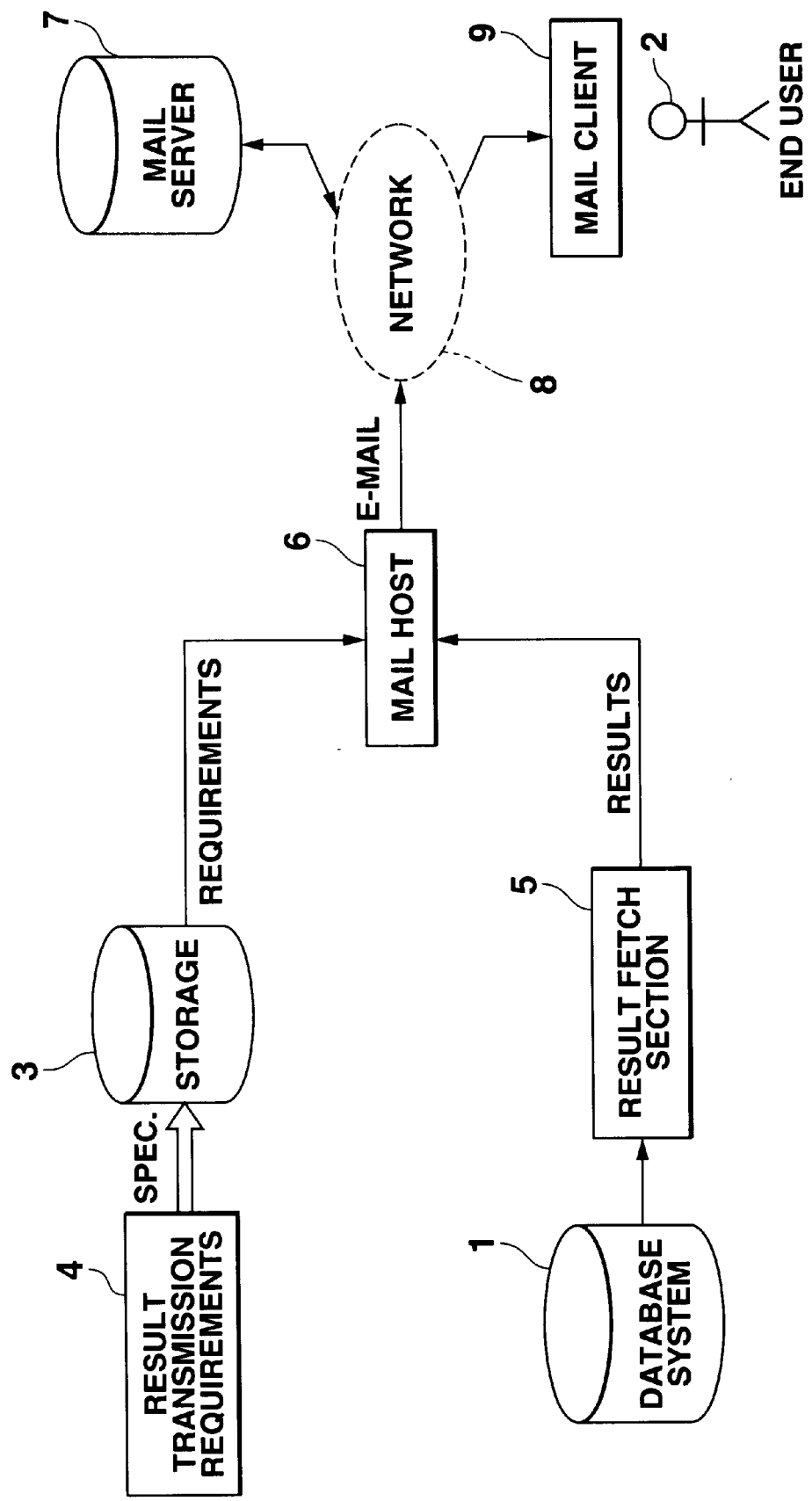
FIG. 1 is a diagram showing the theoretical structure of the present invention.

FIG. 1 is a diagram showing the theoretical structure of the present invention. FIG. 1 shows the entire structure, in which a message (hereinafter referred simply to an analysis result) resulting from regular analysis of data on a database system 1 is transmitted to an end user 2.

Storage 3 stores specifications of the result transmission requirements 4, used for determining whether the analysis result should be sent to the end user 2.

A result fetch section 5 is prepared for fetching analysis results from the database system 1.

A mail host 6 refers to analysis results fetched by the result fetch section 5 whether the fetched results satisfy the result transmission requirements 4 stored in the storage 3. When the analysis result satisfies the result transmission requirements 4, the mail host 6 transmits to a network 8 an electronic mail (e-mail) which is addressed to the end user 2. The e-mail contains the analysis result satisfying the requirements.

In the structure shown in FIG. 1, the e-mail transmitted to the network 8 reaches a mail server 7, and the mail server 7 stores it. The end user 2 operates a mail client 9 to obtain via the network 8 the e-mail addressed to him/her from the mail server 7. As a result, the end user 2 is informed of the analysis result satisfying the result transmission requirements 4. The end user 2 reflect the analysis result to his/her business.

According to the present invention, the e-mail formed result information brings the end user 2 easiness and convenience, because a general personal computer usually has mailer software for handling e-mails. A plurality of specification items of the result transmission requirements 4 may be stored in the storage 3, or the requirements may be modified as needed. The end user 2 modifies the requirement items relating to the current business affairs and stores the specification in the storage device, so that he/she can acknowledge the analysis result only when a remarkable result, to which the end user 2 should pay attention, reaches. This structure eliminates the possibility of missing such important information which may be hidden in a mass of unremarkable results.

In a case where the mail client 9 is always connected to the network 8, the mail client 9 may directly receive an e-mail, instead of temporarily storing the mails from the mail host 6 in the mail server 7.

The network 8 may be, for example, a LAN (Local Area Network), a public switched telephone network, a leased line, the Internet, a combination of the above or the like.

In addition to the above-described method and the device for realizing the method, what is also included in the present invention is a computer readable recording medium which stores programs for making a computer realize the method. The recording medium may include a storage device such as a ROM, a hard disk drive, etc., which is mounted in the computer, a storage device as a detachable device to be attached to the computer, the storage device to be attached to another computer which is connected to the aforementioned computer via the network; a removable storage medium such as a floppy disk, an MO (Magneto-optic disk), a CD-ROM, a DVD-ROM or the like.

As illustrated in FIG. 1, the result fetch section 5 may repeatedly fetch analysis results, whereas the mail host 6 may repeatedly transmits e-mails until the analysis result is repeatedly fetched by the result fetch section 5 does not satisfy the result transmission requirements 4. This structure improves elimination of the possibility of missing information including important analysis result.

In the above case, a substitute for the end user 2 may be registered in the storage 3, etc. After the mail host 6 sends an e-mail to the end user 2 for a predetermined number of times, the mail host 6 may send the e-mail to the substitute as an extra transmission. This structure has advantages for solving problems in business affair, for example, when the analysis result indicates irregular value representing a problem (especially when excess stock is recognized in business affairs for managing the stock). That is, the substitute is also informed of the irregular value, in a case where the problem is not solved despite the end user 2 has been informed of the irregular value by the e-mail for the predetermined number of times. As a result, the problem would be solved by the substitute instead of the end user 2 who can not solve the problem for some reasons. Therefore, resolution possibility is improved.

The structure and operations of the present invention will now be described.

An explanation will be made to a case where a warning mail is sent to an end user for automatically warning the end user that the stock of a particular product exceeds a predetermined number. In this embodiment, the warning mail is processed in an inventory management (in this case, exemplified product is "watch") in a warehouse of a particular company.

Figure 2:
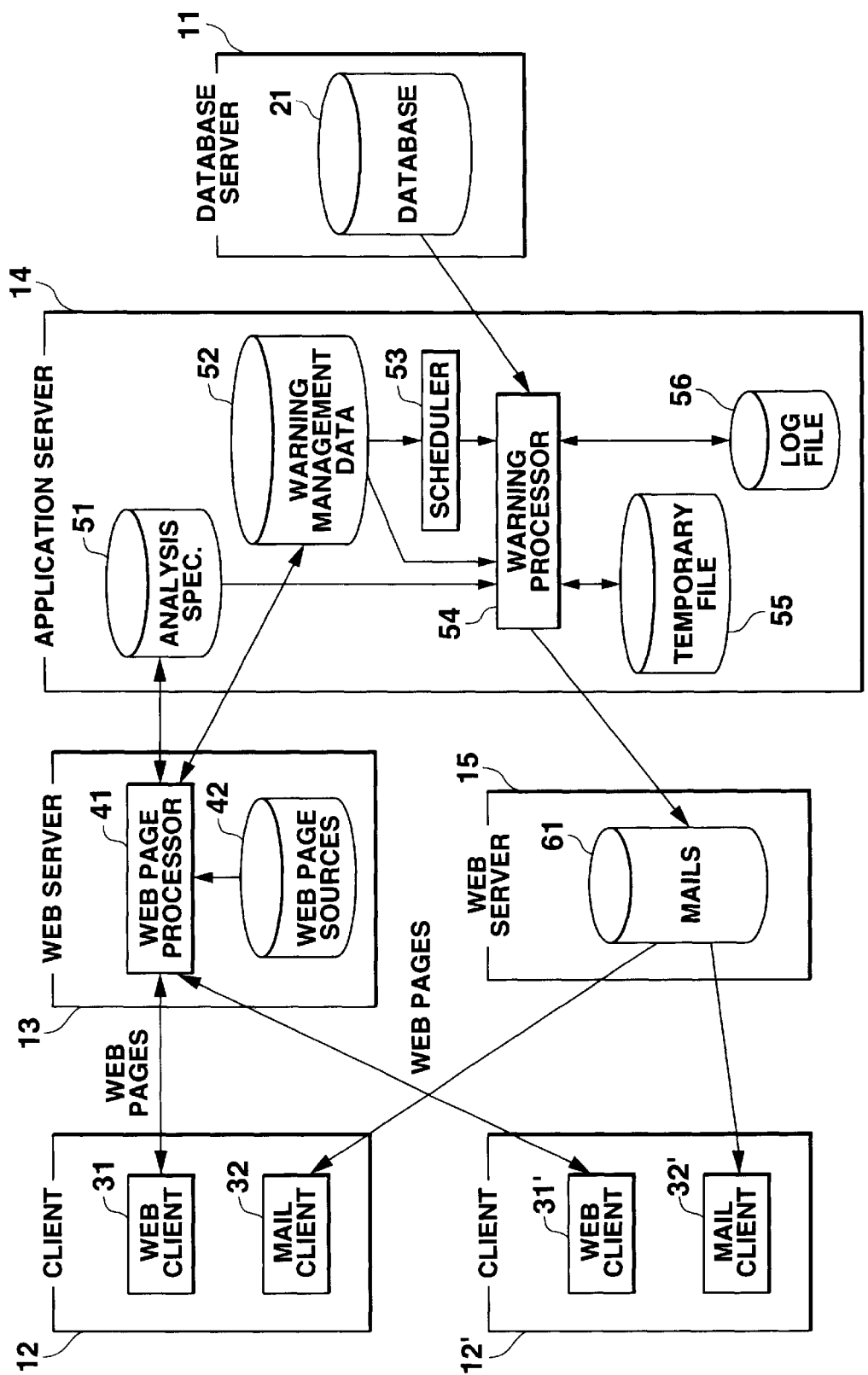
FIG. 2 is a diagram showing the entire structure of an embodiment of the present invention.

FIG. 2 is a diagram showing the entire structure of this embodiment.

Included in the structure are a database server 11, clients 12 and 12', a web server 13, an application server 14 and a mail server 15. Each of them comprises general computer components such as a CPU, internal storage devices, for example, ROM, RAM and the like, external storage devices, for example, a hard-disk unit and the like, and an input/output interface. Each of the general computer components is connected to the network so that data communications are established among each other in this structure.

The application server 14 is one component which is especially related to the present invention. As described in FIG. 2 in relation to FIG. 1, storage in the application server 14 which stores warning management data 52 corresponds to the storage 3, while a warning processor 54 corresponds to the result fetch section 5 and the mail host 6. Further, the mail server 15 corresponds to the mail server 7, while a mail client 32 in the client 12 corresponds to the mail client 9. The database system 1 shown in FIG. 1 includes a database and a function for analyzing data stored in the database, thereby corresponding to the database server 11 and a part of the application server 14 (a part of the warning processor 54 and analysis specification 51) shown in FIG. 2.

A further explanation will specifically be made to FIG. 2.

The database server 11 is a server for the database 21 storing data representing the stock in warehouses.

FIG. 3 is a diagram showing a table representing the structure of a inventory file stored in the database 21. As shown in FIG. 3, a mark "K" in the table indicates that corresponding columns is a key item for extracting a record from the database 21. As shown in the illustration, the database 21 stores data which can be classified according to columns "Date (Year/Month)", "Item Name", "Product Name", "Arrival Quantity", "Shipment Quantity" and "Stock Quantity".

The client 12 is a general personal computer having an web client 31 and a mail client 32 which are operated by an end user relating to the stock management.

The web client 31 is so called a WWW (World Wide Web) browser, and has general functions so that the user can see web pages fetched from a web server 13, and instructions given by the end user can be transmitted to the web server 13 as needed.

The mail client 32 is a general mail managing tool for receiving e-mails addressed to the end user from the mail server 15 (described later) and for presenting contents of the received e-mails to the end user.

The client 12', illustrated in FIG. 2, is a general personal computer having a web client 31' and a mail client 32', which have the same function as that of the client 12 and which are operated by the substitute for the end user (the operator of the client 12) and can manage the inventory as well as the end user.

The web server 13 comprises a web page processor 41 and web page sources 42 stored in storage. The web server 13 creates web pages for presenting information specified in the storage of the application server 14, and sends the created web pages to the client 12 (or client 12'). The web server 13 also adds or modifies the information specified in the storage of the application server 14 on the basis of instructions sent from the end user to the client 12 (or instructions sent from the substitute to the client 12').

The web page processor 41 obtains the analysis specification 51 and the warning management data 52 (described later) registered in the storage of the application server 14. The web page processor 41 creates web pages by arranging the web page sources 42, and sends the created web pages to the client 12 (or the client 12'). The web page processor 41 also obtains instructions given to the client 12 by the end user (or instructions given to the client 12' by the substitute). The web page processor processes the analysis specification 51 and warning management data 52 in order to add or modify the data in accordance with the obtained instructions.

The web page sources 42 are various data sources applicable to the web page creation carried out by the web page processor 41. The web page sources 42 include HTML (Hypertext Markup Language) files for building web pages, GIF (Graphics Interchange Format) files, and applets for realizing interactive functions with, the end user (or the substitute).

The application server 14 comprises a scheduler 53 and the warning processor 54, and further the analysis specification 51, the warning management data 52, a temporary file 55, and a log file 56 which are stored in the storage. The application server 14 analyzes data in the database 21 constantly. When the analysis result satisfies specified requirements, the application server 14 prepares an e-mail addressed to the end user for informing the analysis result, and transmits the prepared e-mail to the mail server 15.

The analysis specification 51 specifies how analyze the data stored in the database 21.

FIG. 4 is a diagram exemplifying the analysis specification 51 in the above-described case. As shown in FIG. 4, "Check Watch Inventory" is registered by the end user as a title of analysis in the analysis specification.

"Target File" indicates file name of a file containing data to be analyzed. In this embodiment of the present invention, "Target File" specifies the inventory file whose structure is shown in FIG. 3.

"Extraction Requirements" indicates requirements (key items) for extracting records having data to be analyzed from a target file. In this example, the requirements are "Date (Y/M)=199809" and "Item=Watch". That is, specified records to be extracted from the inventory file are dated September-1998 and include "watch".

"Analysis Targets" indicates to-be-analyzed data and a direct key item to obtain the to-be-analyzed-data from the records extracted in accordance with the extraction requirements. In this example, contents of the "Analysis Targets" mean 'fetch "Stock Quantity" of "Product Name" from the extracted record'.

The warning management data 52 will now be described in detail. The warning management data 52 specifies various data items necessary for preparing and transmitting e-mails. The e-mail prepared based on the warning management data 52 represents a result after the data stored in the database 21 are analyzed. The prepared e-mail will be automatically transmitted to the end user.

FIGS. 5A to 5C are diagrams showing samples of categories in the warning management data 52.

FIG. 5A shows sender's information of a warning mail to be prepared. In this example, registered items are an address of the mail server 15 (Server Add.), a sender's mail address (that is, mail address assigned to the application server 14 (Mail Add.)), and a password.

FIG. 5B shows specification which directly relates to the present invention. That is, the specification includes requirements for the analysis result necessary for transmitting the warning mail by the warning processor 54 (this process will be described in detail later), destination of the warning mail by routine transmission (primary address: end user's address), and destination of the warning mail by extra transmission (secondary address: substitute's address).

The specification in the table shown in FIG. 5B mean 'to prepare and transmit a warning mail having subject "Inventory Warning (Watch)" to "abc@mailhost.co.jp (the end user's address)", if the "Stock Quantity" exceeds 10,000 after analyzing data regarding to "Check Watch Inventory" shown in FIG. 4.' The specification further means 'to prepare and transmit the warning mail to "def@mailhost.co.jp (the substitute's address)", if the result still satisfies the aforementioned requirements for transmission after transmitting the warning mail three times in past seven days to the end user'.

FIG. 5C shows specification for the later-described scheduler 53. In FIG. 5C, the specification means 'to invoke the warning processor 54 everyday at 8:00 a.m.; this schedule will be effective after 1998/09/24'.

The scheduler 53 will now be described in detail. The scheduler 53 invokes the warning processor 54 in accordance with the specification registered in the warning management data 52. In accordance with the example shown in FIG. 5C, the scheduler 53 invokes the warning processor 54 everyday at 8:00 a.m. after 1998/09/24.

The warning processor 54 is repeatedly invoked by the scheduler 53. Once invoked, the warning processor 54 performs automatic warning which is related to the present invention. That is, the warning processor 54 analyzes data stored in the database 21 of the database server 11 in accordance with the analysis specification 51. If the analysis result satisfies the requirements for warning mail transmission in the warning management data 52, the warning processor 54 prepares an e-mail addressed to the end user. If the result further satisfies the requirements for extra transmission, the warning processor 54 also prepares the e-mail addressed to the substitute. The prepared e-mail is transmitted to the email server 15. The automatic warning will be described in detail later.

The temporary file 55 is prepared for temporarily storing data necessary for the later-described automatic warning.

The log file 56 is a file in which history of transmitted warning mails is stored for reference.

The mail server 15 is so called a POP (Post Office Protocol) server which receives and stores e-mails 61 addressed to users of the network described in the embodiment of the present invention. End users and their substitutes are included in the above network users.

A process flow of the automatic warning carried out by the warning processor 54 will now be described.

Figure 6:
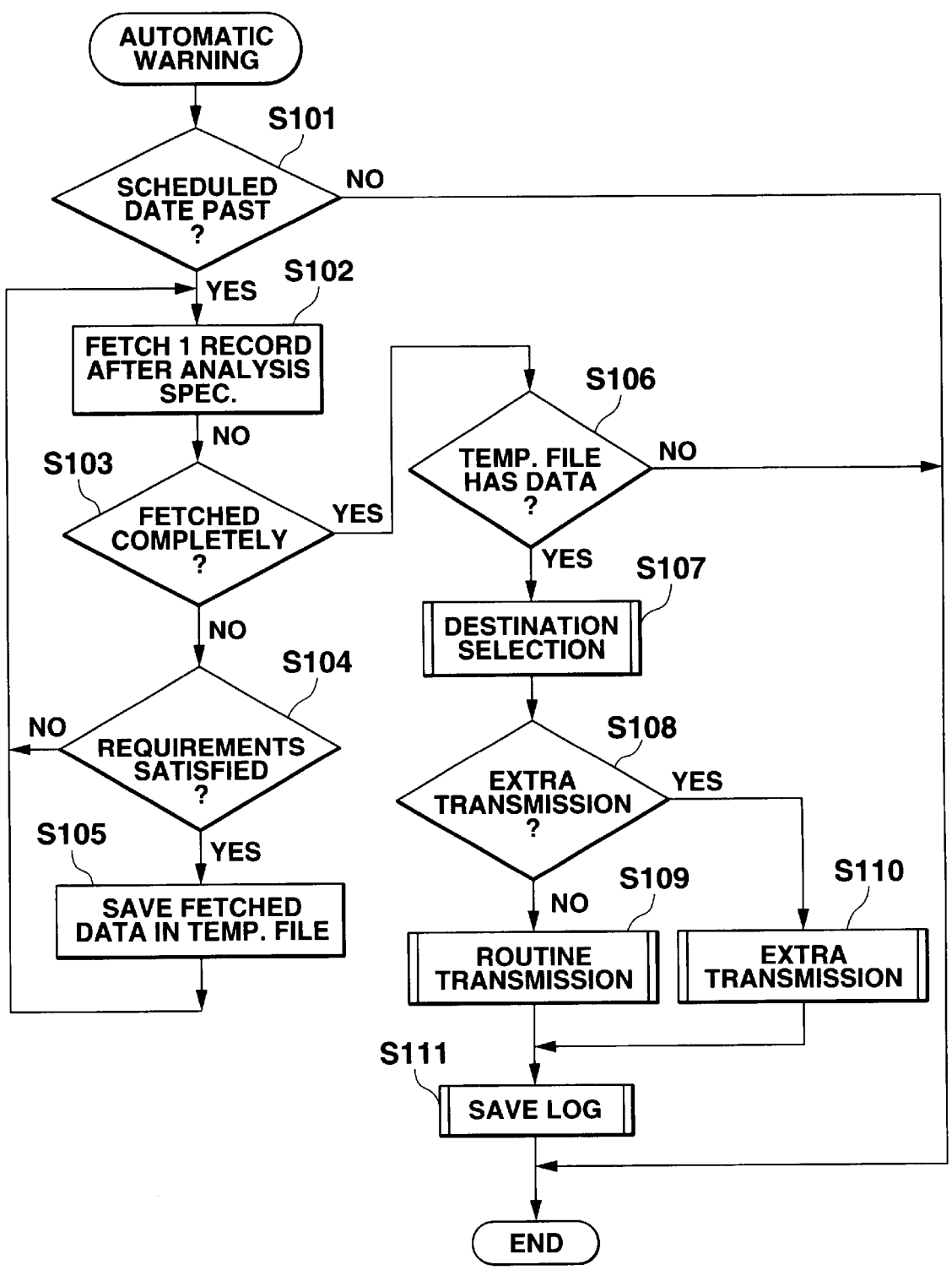
FIG. 6 is a flowchart showing contents of a warning process.

FIG. 6 is a flowchart showing steps of the automatic warning. For example, the process flow starts in response to execution of a control program stored in the ROM in the application server 14 under a control of the CPU.

The steps of the automatic warning will now be described with reference to the flowchart shown in FIG. 6.

When the warning processor 54 is invoked by the scheduler 53, the warning processor 54 obtains schedule management data 52 in step S101, and compares the start date ("1998/9124" in FIG. 5C) registered in the schedule management data 52 with the present date. If the start date has been past date, the flow goes to step S102. On the contrary, if the present date is before the start date, the automatic warning is terminated immediately.

In step S102, the warning processor 54 obtains a record from remained records in the database 21. In this step, an appropriate record is one which satisfies the analysis specification 51. Referring to the analysis specification 51 for "Check Watch Inventory" shown in FIG. 4, the warning processor 54 fetches a record, which is dated "199809" while including "Watch" as the item name, from the inventory file stored in the database 21.

In step S103, it is determined whether records which satisfy the requirements registered in the analysis specification 51 were completely fetched from the database 21 before step S102 (that is, the warning processor 54 could not fetch an appropriate record in step S102). If all appropriate records has been fetched, the flow goes to step S106. If the warning processor 54 could fetch an appropriate record in step S102, the flow goes to step S104.

In step S104, analysis of the record fetched in step S102 is carried out, and it is determined whether the analysis result satisfies the requirements for warning mail transmission registered in the warning management data 52. Referring to FIG. 5B, it is determined whether the stock quantity in the fetched record exceeds 10,000 or not. If the requirements for the warning mail transmission are satisfied after the determination, the flow goes to step S105. If not, the flow returns to step S102 to fetch another record and analyze it.

In step S105, data in the record which satisfies the requirements for warning mail transmission are stored in the temporary file 55. Referring to FIGS. 3 to 5, data items "Product Name" and "Stock Quantity" in the records whose "Stock Quantity" exceeds 10,000, of the fetched records are stored in the temporary file 55.

After step S105, the flow returns to step S102 to fetch another record from the database 21 and analyze it.

In step S106, it is determined whether the temporary file 55 has data or not. If the temporary file 55 has any data (that is, the records which satisfy the requirements for the warning mail transmission are stored therein), the flow goes to step S107. If not, the automatic warning is terminated without transmitting a warning mail.

In step S107, destination selection. by which destination of a waning mail is determined based on transmission history of past warning mails is carried out. In this process, any one of an ordinary end user (for routine transmission), or a substitute for the ordinary end user (for extra transmission) is selected as the destination. The destination selection will be described in detail later.

In step S108, it is determined which one is selected in the former step as the destination. If the selected destination is the ordinary end user (destination for the routine transmission), the flow goes to step S109. If the selected destination is the substitute (destination for the extra transmission), the flow goes to step S110.

In step S109, warning mail transmission to the ordinary end user is executed. The warning mail to be sent by this step includes the data of the record stored in the temporary file 55 as a mail body. That is, the record which satisfied the requirements for warning mail transmission. After the above processing is completed, the flow goes to the step S111. The warning mail transmission to the ordinary end user will be described in detail later.

In step S110, warning mail transmission to the substitute for the ordinary end user is executed. The warning mail to be sent by this step also includes the data of the record stored in the temporary file 55 as a mail body, that is, the record satisfied the requirements for the warning mail transmission. The warning mail transmission to the substitute for the ordinary end user will be described in detail later.

In step S111, logged history of transmitted mails is stored in the log file 56, then the automatic warning is terminated.

Since the automatic warning is repeatedly activated by the scheduler 53, warning mails are automatically and repeatedly transmitted until the analysis result of the data stored in the database 21 does not satisfy the requirements for warning mail transmission.

The destination selection (step S107, FIG. 6) will now be described. This step is prepared to determine destination of a warning mail. Any one of an ordinary end user (for routine transmission), or a substitute for the ordinary end user (for extra transmission) is selected as the destination. The selection is based on history of transmitted warning mails. In a case where the result after analyzing data stored in the database 21 still satisfies the requirements for the warning mail transmission even if the warning mail have been sent to the ordinary end user for predetermined times, the same warning mail is transmitted to the substitute for the ordinary end user. This process is helpful to notice the substitute that the ordinary end user can not solve problems for some reasons.

Figure 7:
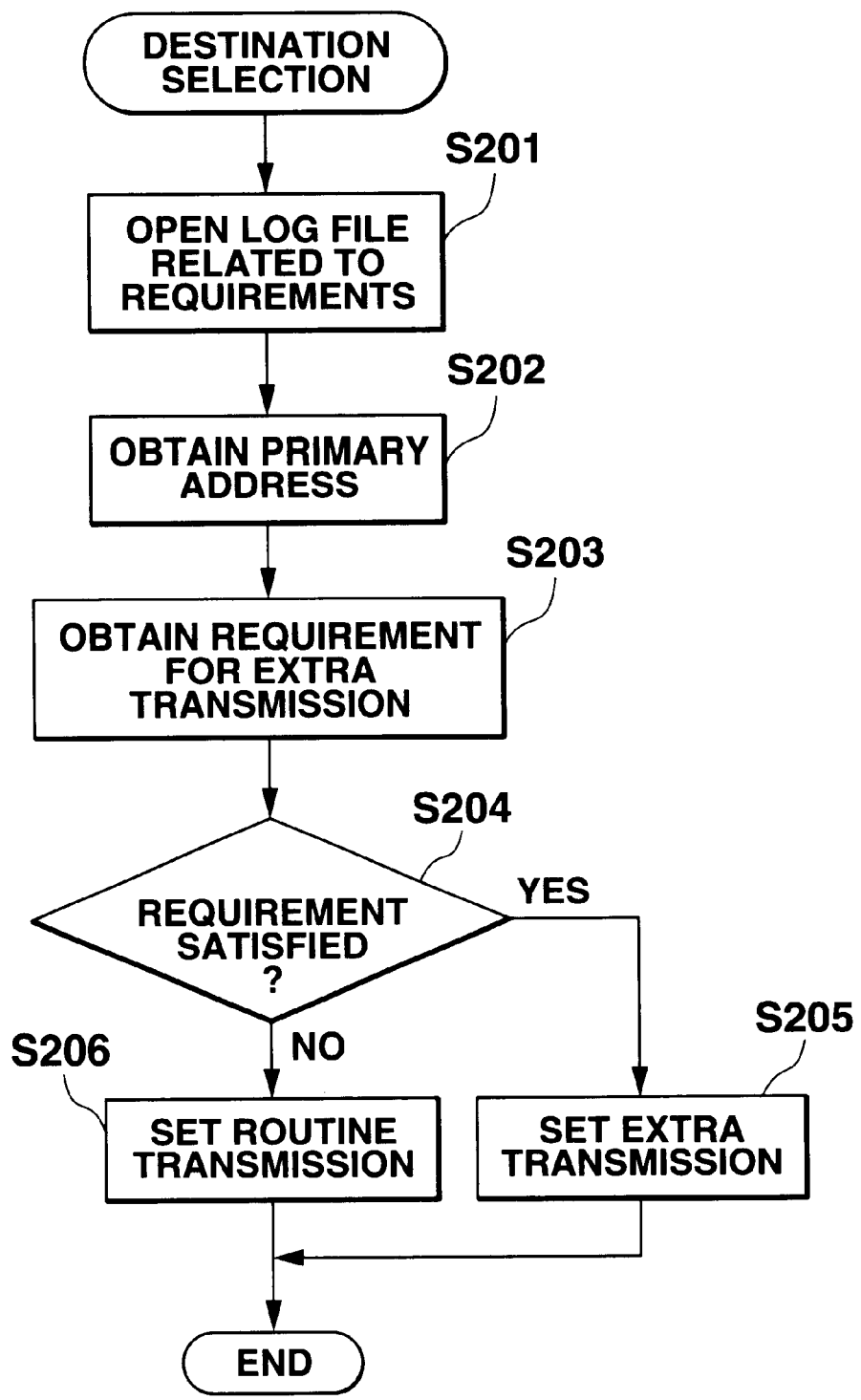
FIG. 7 is a flowchart showing contents of a process for setting requirements for sending information to a substitute.

FIG. 7 is a flowchart showing a process flow for the destination selection. The steps of the process flow will now be described with reference to FIG. 7.

In first step S201, the warning processor 54 refers the log to file 56 which includes the transmission history of the warning mails each of whose body represents data in the temporary file 55 (step S106, FIG. 6), that is, the data of the record which satisfied the requirements for the warning mail transmission.

In step S202, the warning processor 54 obtains destination mail address, that is, mail address of the ordinary end user from the specification table for the warning mail transmission requirements. Referring to FIG. 5B, the warning processor 54 obtains the primary mail address "abc@mailhost.co.jp".

In step S203, the warning processor 54 obtains a requirement for selecting the destination from the specification table for the warning mail transmission requirements of the automatic waning management data 52. Referring to FIG. 5B, the warning processor 54 obtains the requirement "If: Sent 3 Times in Last 7 Days".

In step S204, the warning processor 54 determines whether the transmission history of the warning mail which is addressed to the mail address obtained in step S202 satisfies the requirement for selecting the destination which is obtained step S203 or not, after investigating the transmission history in the log file 56 to which the warning processor 54 referred in step S201. Referring to FIG. 5B, the warning processor 54 determines whether a warning mail addressed to "abc@mailhost.co.jp" has been transmitted three times in last seven days or not. If it is determined that the requirement is satisfied, the flow goes to step S205. If not, the flow goes to step S206.

In step S205, the warning processor 54 sets extra transmission to the substitute, and the destination selection is terminated.

In step S206, the warning processor 54 sets routine transmission to the ordinary end user, and the destination selection is terminated.

Warning mail transmission (steps S109, S110 shown in FIG. 6) will now be described.

Figure 8:
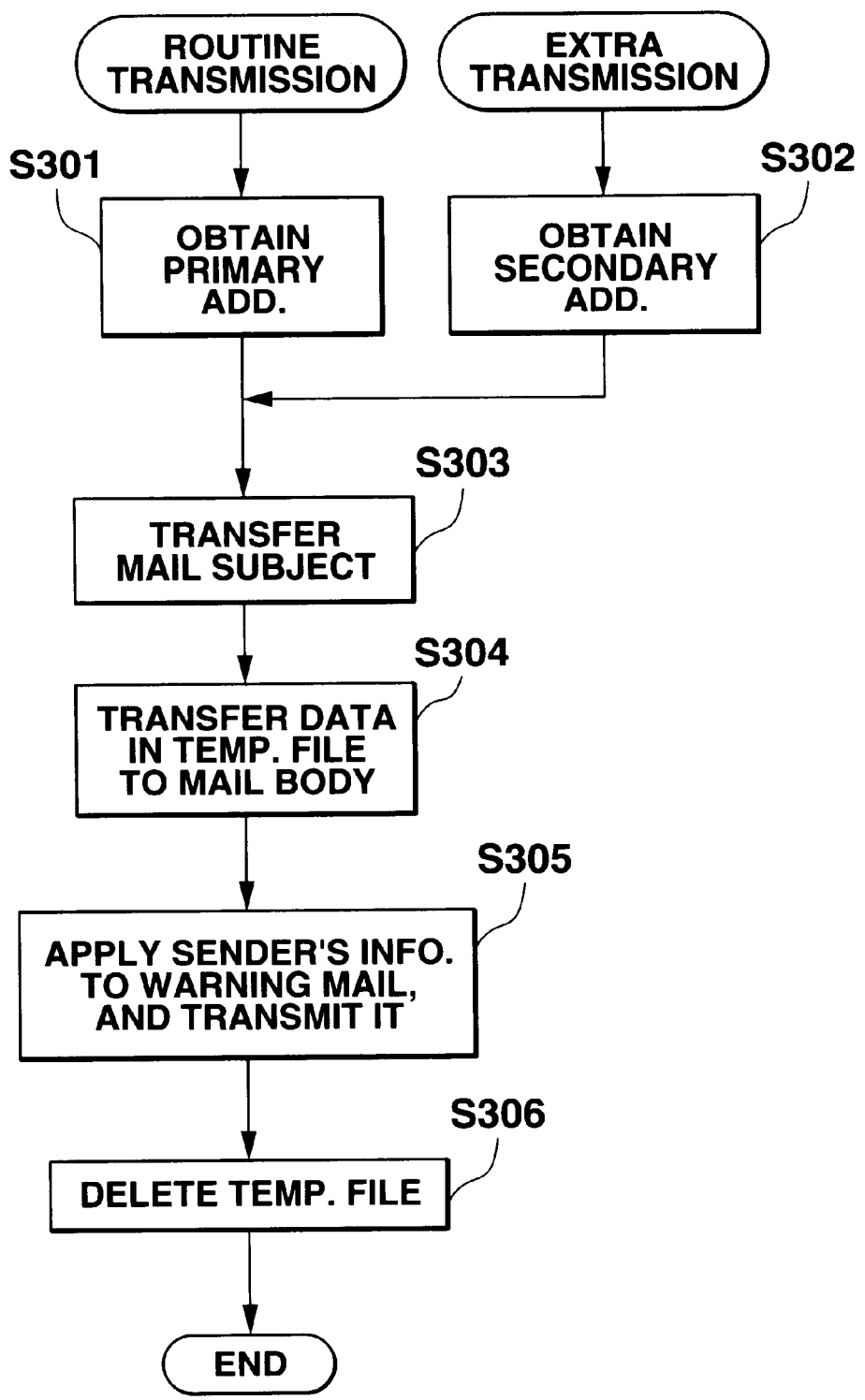
FIG. 8 is a flowchart showing contents of a process for sending a warning mail.

FIG. 8 is a flowchart showing steps of the warning mail transmission. The process flow of the warning mail transmission will now be described with reference to FIG. 8.

When the routine transmission to the ordinary end user has been set (that is, this processing is executed as step S109 (FIG. 6)), step S301 (FIG. 8) will be a first step for the warning mail transmission. On the contrary, when the extra transmission to the substitute has been set (that is, this processing is executed as step S110 (FIG. 6)), step S302 (FIG. 8) will be a first step for the warning mail transmission.

In step S301, the warning processor 54 obtains the mail address of the ordinary end user from the specification table for the warning mail transmission requirements in the warning management data 52, as the destination of the warning mail by the routine transmission. Referring to FIG. 5B, the warning processor 54 obtains the primary mail address "abc@mailhost.co.jp". After the process of step S301 is completed, the flow goes to step S303.

In step S302, the warning processor 54 obtains the mail address of the substitute from the specification table of the warning mail transmission requirements in the warning management data 52, as the destination of the warning mail by the extra transmission. Referring to FIG. 5B, the warning processor 54 obtains the secondary mail address "def@mailhost.co.jp".

In step S303, the warning processor 54 obtains a mail title from the specification table for the warning mail transmission requirements in the automatic warning manage data 52. The obtained mail title is transferred to a subject (title) column of the warning mail being prepared. Referring to FIG. 5B, the warning processor 54 obtains "Inventory Warning (Watch)".

In step S304, the warning processor 54 obtains data items stored in the temporary file 55, that is, data items in the record which satisfies the warning mail transmission requirements, and the obtained data items are transferred to a body of the warning mail being prepared. Referring to FIGS. 3 to 5, the warning processor 54 obtains contents of "Product Name" and "Stock Quantity", and applies them to a body of the warning mail being prepared. Those data items are stored in the record whose data item "Stock Quantity" indicates a value greater than 10,000, of the extracted records from the inventory file.

In step S305, the warning processor 54 obtains server address, sender's mail address and password from a sender's information table in the warning management data 52. The obtained mail address of the sender is applied to a header section of the warning mail to be transmitted, in order to indicate the sender. The prepared warning mail is transmitted to the mail server 15 together with the server address and password. The mail server 15 stores the received warning mail as one of the mails 61. In this example according to FIGS. 3 to 5C, the transmission is carried out with using the sender's information shown in FIG. 5A.

In step S306, the data items in the temporary file 55, that is, the data items have been applied to the warning mail, are deleted, and then the warning mail transmission is terminated.

FIG. 9 exemplifies a warning mail addressed to the ordinary end user to be transmitted by the warning processor 54 according to the above described embodiment. According to the shown mail body of the warning mail (lower center portion of the diagram), it shows product "W101" whose stock quantity is "100,100" and product "W901" whose stock quantity is "100,050". That is, it proves that this warning mail is transmitted based on satisfaction of the warning mail transmission requirements shown in FIG. 5B which requires stock quantity exceeding 10,000.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A method of informing an end user, requesting a data analysis result, about a message resulting from analysis of data stored in a database of a database system, said method comprising the steps of:

specifying a schedule of performing data analysis received through a communication network, data items to be analyzed in the database, and requirements for informing the analysis result, upon reception of an instruction from the end user requesting the data analysis result;

fetching data resulting from the analysis of data using the specified data items to be analyzed periodically in accordance with the specified schedule;

determining an addressee of the result of the data analysis, in a case where the fetched data satisfies the specified requirements for informing the analysis result;

generating a message representing that the result of the data analysis to be sent to the determined addressee satisfies the specified requirements; and transmitting the generated message to the end user through the communication network.

2. The method according to claim 1, wherein the message is provided in the form of an electronic mail over the Internet.

3. The method according to claim 1, wherein the data analysis is performed repeatedly in accordance with the schedule; and in said step of transmitting the generated message to the requesting end user, a same message is transmitted repeatedly while, in a process of results of the data analysis being fetched in accordance with the schedule, a same result of the data analysis that satisfies the specified requirements is being fetched.

4. The method according to claim 3 wherein:

the requirements for informing the analysis result specified upon reception of the instruction from the end user requesting the informing of the analysis result include requirements for informing a substitute of the end user about a same message as the generated message sent to the addressee through the communication network;

said step of determining the addressee of the result of the data analysis includes storing information representing a number of times the message is sent to the end user requesting the analysis result, thereby determining whether the stored information representing the number of times satisfies a number of transmission times included in the requirements for informing the substitute of the end user; and said step of generating the message includes generating a message addressed to an end user, specified in the requirements for informing the analysis result, as the substitute of the end user, in a case where a result of the determining satisfies the number of transmission times included in the requirements for informing the substitute of the end user.

5. An apparatus for informing an end user, requesting a data analysis result, about a message resulting from analysis of data stored in a database of a database system, said apparatus comprising:

storage means for storing a specified schedule of performing data analysis received through a communication network, data items to be analyzed in the database, and requirements for informing the analysis result, upon reception of an instruction sent from the end user requesting the data analysis result;

analysis result fetching means for fetching data resulting from the analysis of data using the specified data items to be analyzed periodically in accordance with the specified effective schedule;

determination means for determining an addressee of the result of the data analysis, in a case where the fetched data satisfies the specified requirements for informing the analysis result;

means for generating a message representing that the result of the data analysis to be sent to the determined address satisfies the specified requirements; and transmission means for transmitting the generated message to the end user through the communication network.

6. A computer readable recording medium storing a program to be executed by a computer in order to inform an end user of a message resulting from analysis of data stored in a database of a database system, said program making said computer:

store a specified effective schedule of data analysis received through a communication network, data items to be analyzed in the database, and requirements for informing the analysis result, upon reception of an instruction from the end user requesting the data analysis result;

fetch data resulting from analysis of data using the data items to be analyzed periodically ir. accordance with the specified effective schedule; and determine an addressee of the data analysis, in a case where the fetched data satisfies the specified requirements for informing the analysis result;

generate a message representing that the data analysis to be sent to the determined addressee satisfies the specified requirements; and transmit the generated message to the end user through the communication network.

7. The method according to claim 1, wherein:

said fetching the data resulting from the analysis of data using the data items to be analyzed is performed repeatedly until all data corresponding to the data items to be analyzed are completely fetched; and said generating the message includes temporarily storing the analysis result, in a case where the analysis result which is fetched every time the fetching of the analysis result is performed satisfies the requirements for Informing the analysis result, and generating a message including analysis result data, in a case where the analysis result data is stored when the fetching of the analysis result is completed.

* * * * *